(12) United States Patent
Scifres

(10) Patent No.: US 6,491,420 B1
(45) Date of Patent: *Dec. 10, 2002

(54) ADDRESSABLE VEHICULAR LIGHTING SYSTEM

(75) Inventor: Donald R. Scifres, Los Altos, CA (US)

(73) Assignee: JDS Uniphase Corporation, San Jose, CA (US)

(*) Notice: Subject to any disclaimer, the term of this patent is extended or adjusted under 35 U.S.C. 154(b) by 52 days.

This patent is subject to a terminal disclaimer.

(21) Appl. No.: 09/590,523

(22) Filed: Jun. 8, 2000

Related U.S. Application Data

(63) Continuation of application No. 08/902,741, filed on Jul. 29, 1997, now Pat. No. 6,152,588, which is a continuation-in-part of application No. 08/313,757, filed on Sep. 28, 1994, now Pat. No. 5,713,654.

(51) Int. Cl.[7] .............................. F21V 8/00; B60Q 1/44
(52) U.S. Cl. ..................... 362/553; 362/259; 362/551; 362/554; 362/511; 356/4.01; 356/5.01; 340/479
(58) Field of Search ................................ 362/551, 552, 362/553, 554, 582, 583, 511, 540, 543, 544, 580, 294, 373, 800, 249, 545, 20, 230; 340/479, 468; 385/14; 356/4.01, 5.01

(56) References Cited

U.S. PATENT DOCUMENTS

| | | | |
|---|---|---|---|
| 4,357,594 A | 11/1982 | Ehrlich et al. | 340/72 |
| 4,411,057 A | 10/1983 | Duda et al. | 29/569 |
| 4,628,422 A | 12/1986 | Edwald | 362/240 |
| 4,694,295 A | 9/1987 | Miller et al. | 340/903 |
| 4,862,802 A | 9/1989 | Streifer et al. | 102/201 |
| 4,868,718 A | 9/1989 | Davenport et al. | 362/32 |

(List continued on next page.)

FOREIGN PATENT DOCUMENTS

| | | |
|---|---|---|
| DE | 4010-825 | 4/1990 |
| EP | 0490292 | 6/1992 |

OTHER PUBLICATIONS

Shah et al, "Efficient Power Coupling from a 980–nm Broad–area Laser to a Single–Mode Fiber Using a Wedge–shaped Fiber Endface", Journal of Lightwave Tech., vol. 8, No. 9, Sep. 1990, pp. 1313–1318.

Edwards et al, "Ideal Microlenses for Laser to Fiber Coupling", Journal of Lightwave Tech., vol. II, No. 2, Feb. 1993, pp. 252–257.

*Primary Examiner*—Thomas M. Sember
(74) *Attorney, Agent, or Firm*—Jeff Klembczyk, Esq.

(57) ABSTRACT

A vehicle with a plurality of individually addressable light sources, preferably semiconductor laser light sources or light emitting diodes, each of which produce a beam of light, are optically coupled to a fiber optic waveguide. The laser light sources are grouped together preferably at a single location within the vehicle for easy access and conveniently located within the vehicle. Fiber waveguides distally transmits the beams to the optical loads of the vehicle, including the brake lights, taillights, instrumentation lights and turn signals. Each fiber optic waveguide may be a single optical fiber, such as a multimode fiber, having a numerical aperture large enough to receive illumination from a plurality of light sources. In cases where some optical loads require a larger flux or brightness of light, such as vehicular headlights, which may greater than a single optic fiber can transmit, the waveguide may comprise of a bundle of optical fibers. Multiple light sources to a single optical output load allows switching to another operational light source or increase the intensity of remaining light sources should one light source fail. In this manner, the operational life of the vehicular lighting system is increased. Also disclosed is circuitry for operating applications of the system as well as illustrating the employment of color wavelength laser light sources.

24 Claims, 10 Drawing Sheets

U.S. PATENT DOCUMENTS

| | | | |
|---|---|---|---|
| 4,930,049 A | 5/1990 | Davenport et al. | 362/32 |
| 4,932,747 A | 6/1990 | Russell et al. | |
| 4,935,722 A | 6/1990 | Pollack | 340/479 |
| 5,015,918 A | 5/1991 | Copeland | 362/227 |
| 5,053,929 A * | 10/1991 | Le Gars | 362/20 |
| 5,111,182 A | 5/1992 | Ishikawa et al. | 340/479 |
| 5,184,883 A | 2/1993 | Finch et al. | 362/32 |
| 5,207,492 A * | 5/1993 | Roberts | 362/30 |
| 5,222,795 A | 6/1993 | Med | 362/31 |
| 5,278,731 A | 1/1994 | Davenport et al. | 362/32 |
| 5,311,410 A | 5/1994 | Hsu et al. | 362/20 |
| 5,365,413 A | 11/1994 | Krammer | 362/32 |
| 5,373,280 A | 12/1994 | Louy et al. | 340/468 |
| 5,400,225 A | 3/1995 | Currie | 362/32 |
| 5,434,756 A * | 7/1995 | Hsu et al. | 362/20 |
| 5,436,805 A | 7/1995 | Hsu et al. | 362/32 |
| 5,438,487 A | 8/1995 | Schmid et al. | 362/61 |
| 5,452,186 A | 9/1995 | Dassanayake | 362/80 |
| 5,477,436 A | 12/1995 | Bertling et al. | 362/231 |
| 5,546,188 A * | 8/1996 | Wangler et al. | 356/376 |
| 5,644,584 A | 7/1997 | Nam et al. | 372/20 |
| 5,713,654 A | 2/1998 | Scifres | 362/80 |

* cited by examiner

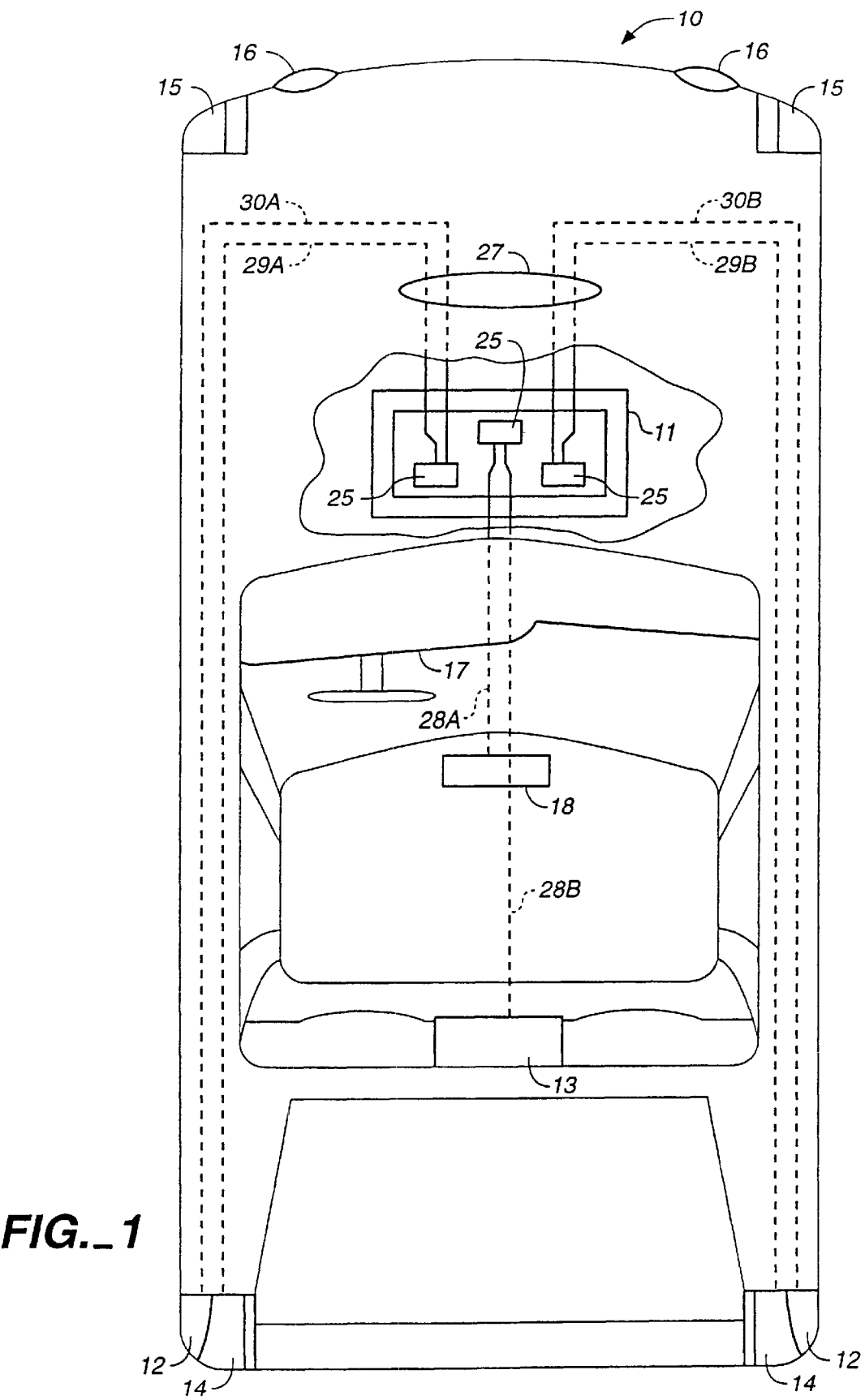
FIG._1

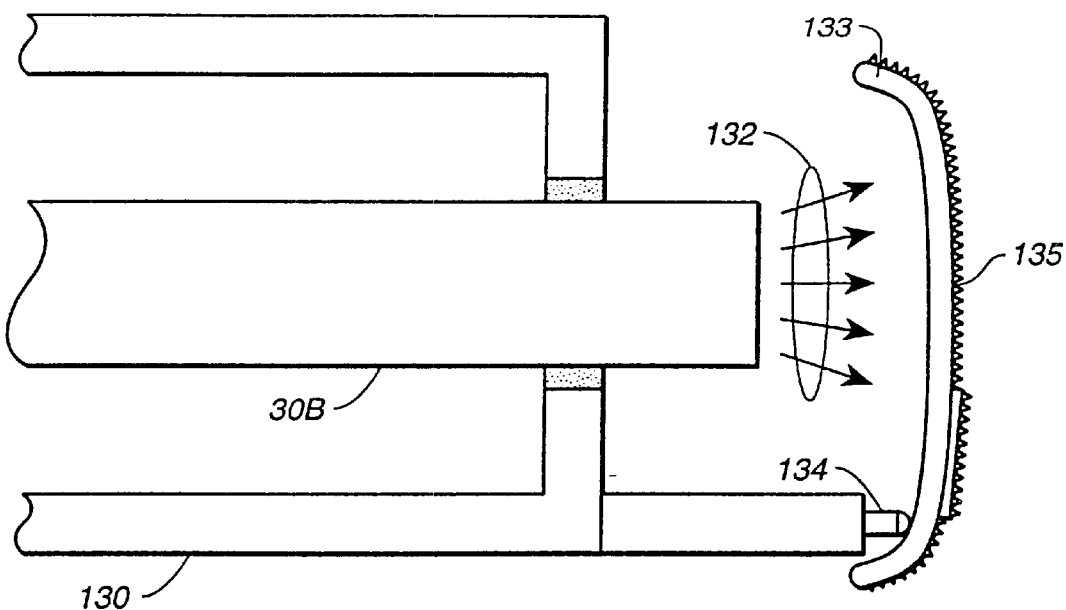
FIG._2A
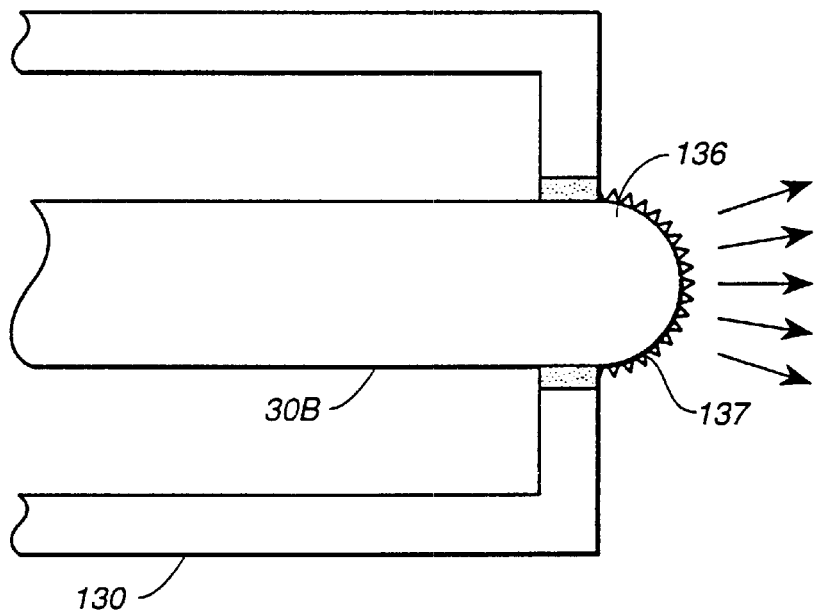
FIG._2B

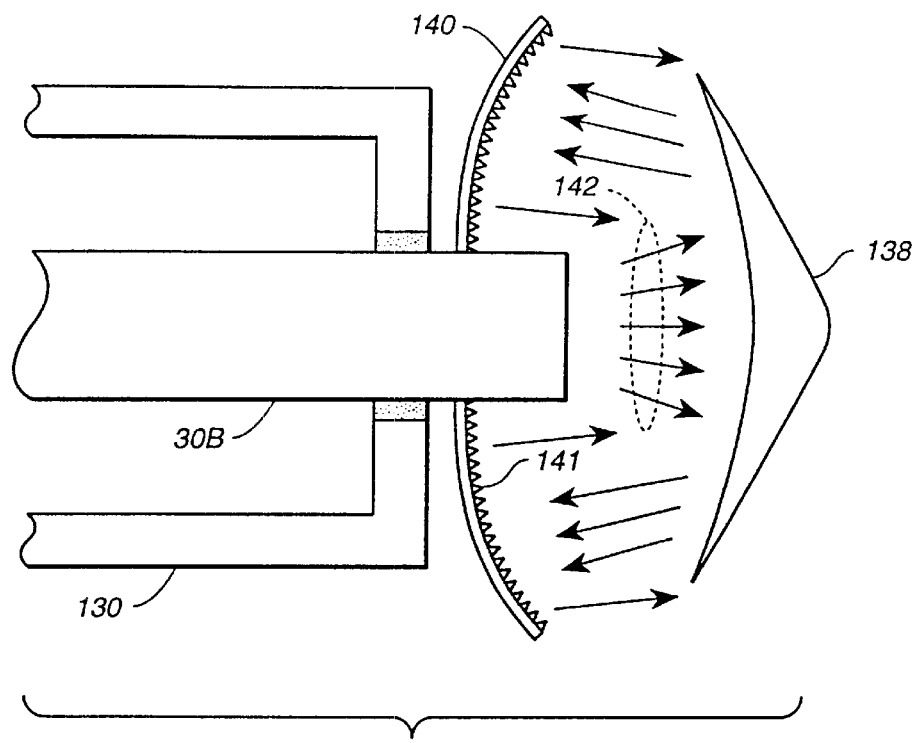
FIG._2C
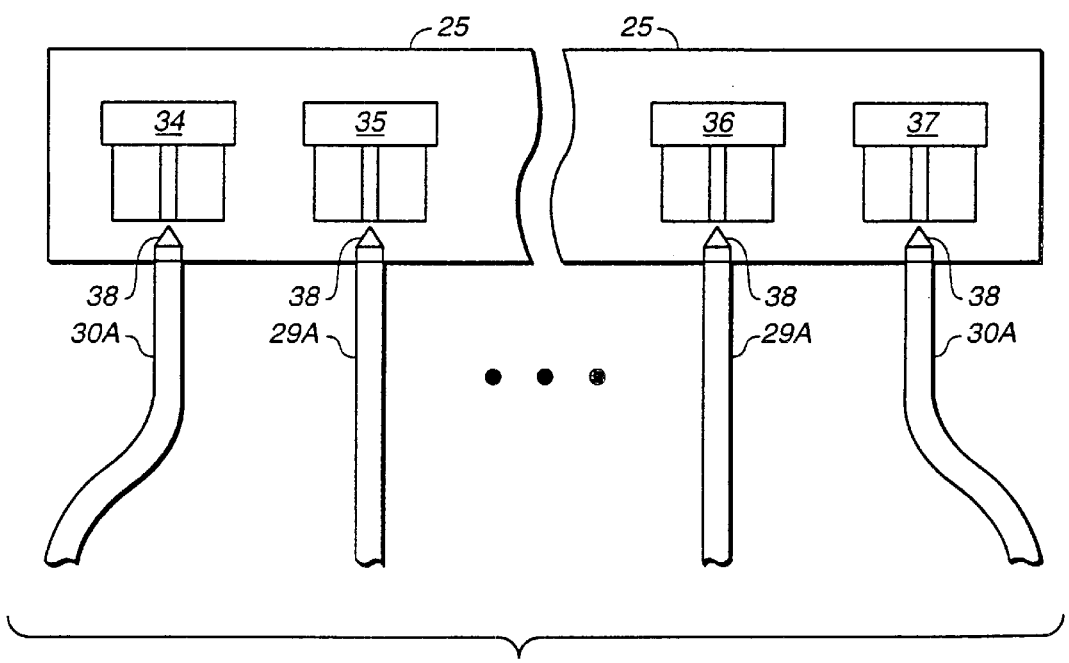
FIG._3

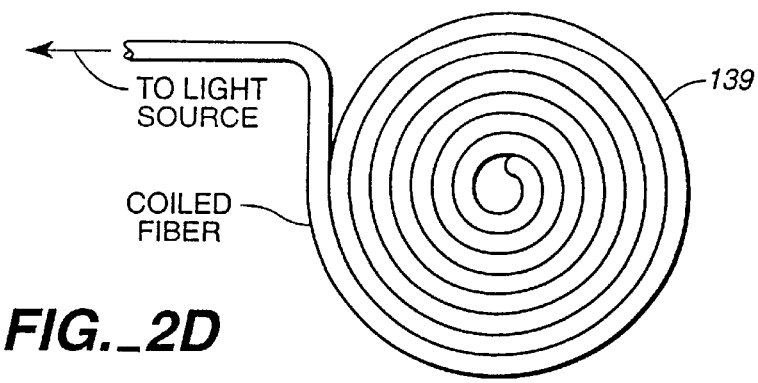
FIG._2D
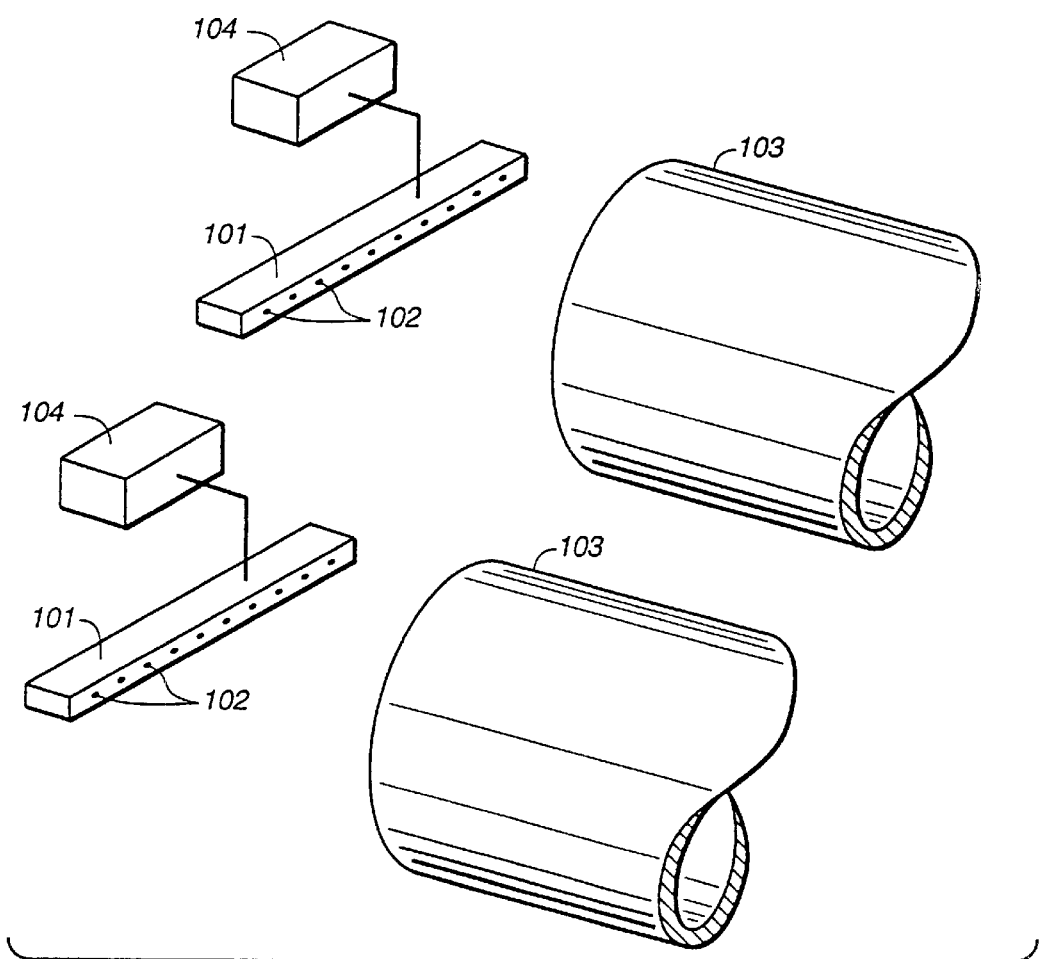
FIG._5

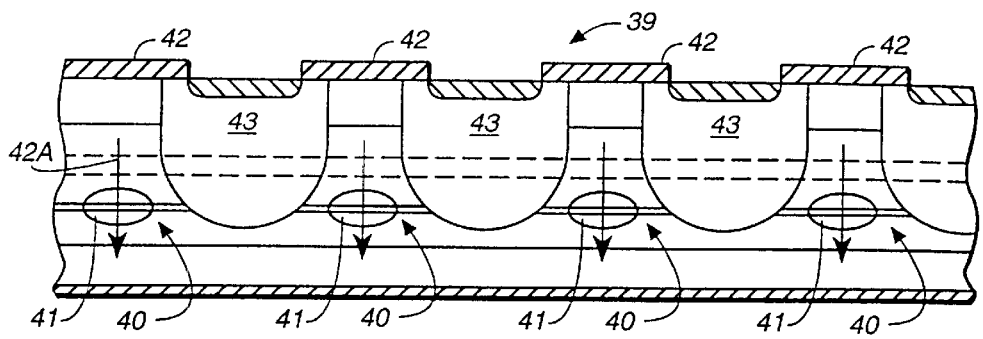
FIG._4
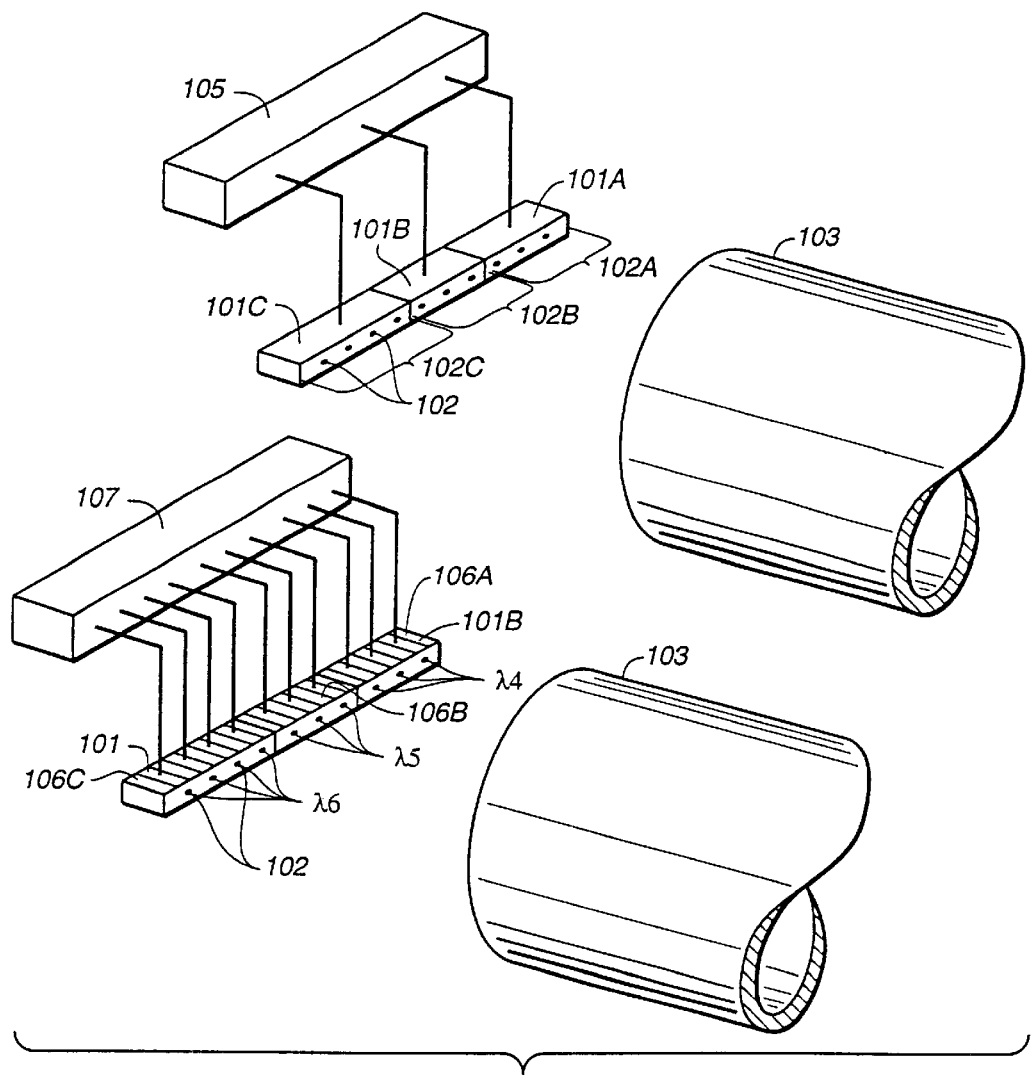
FIG._5A

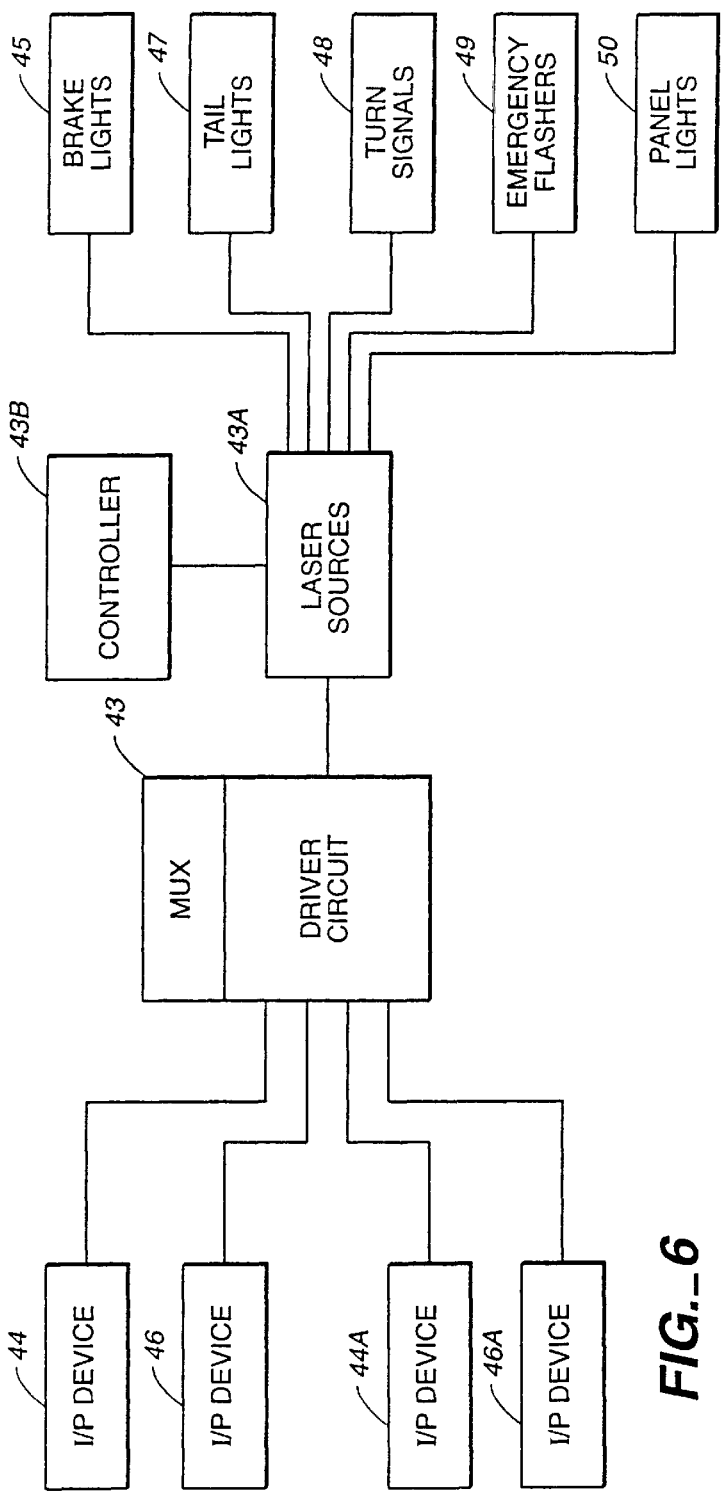
FIG._6
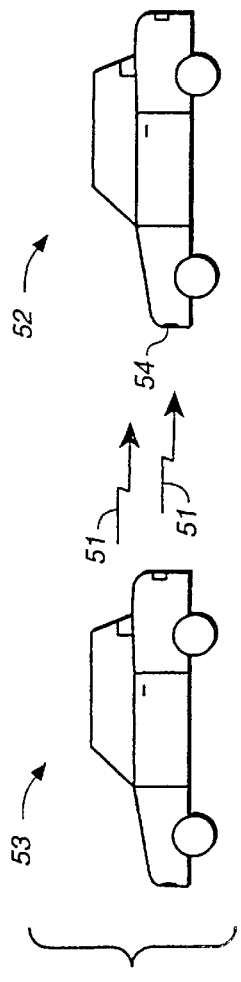
FIG._7

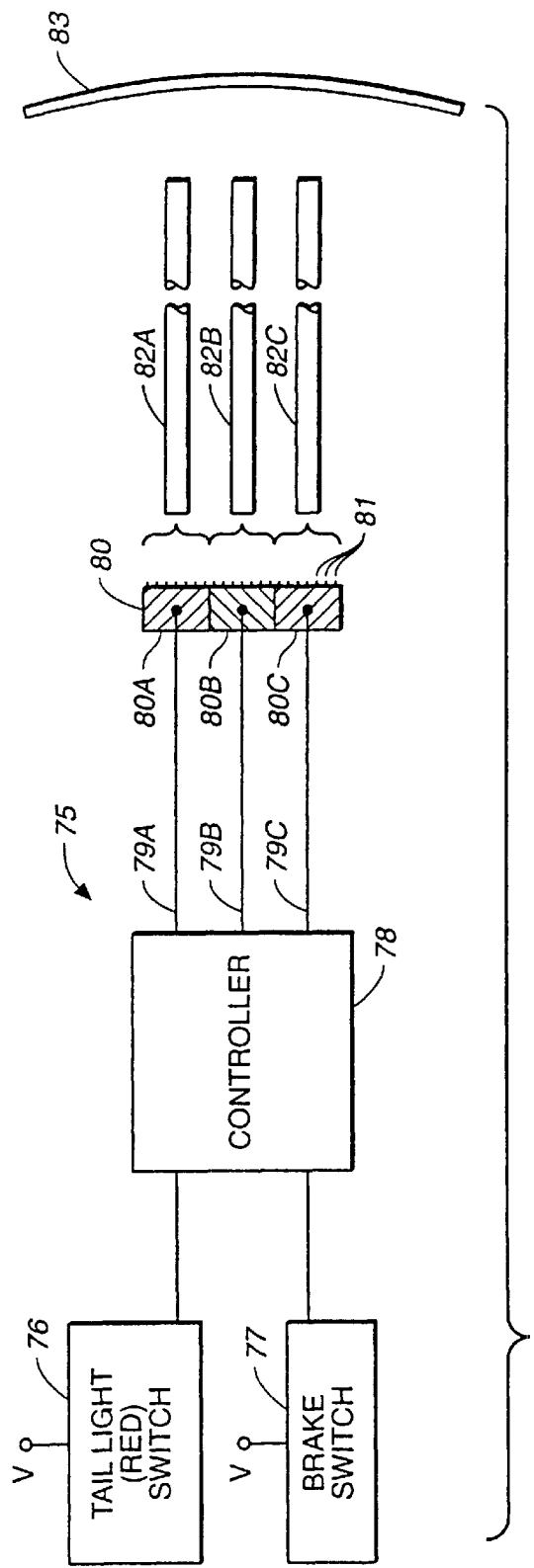
FIG._8
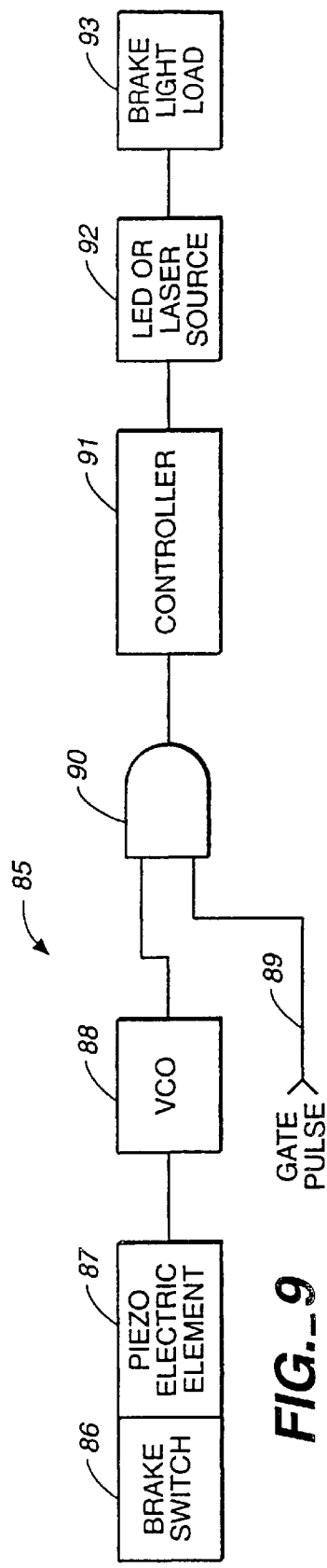
FIG._9

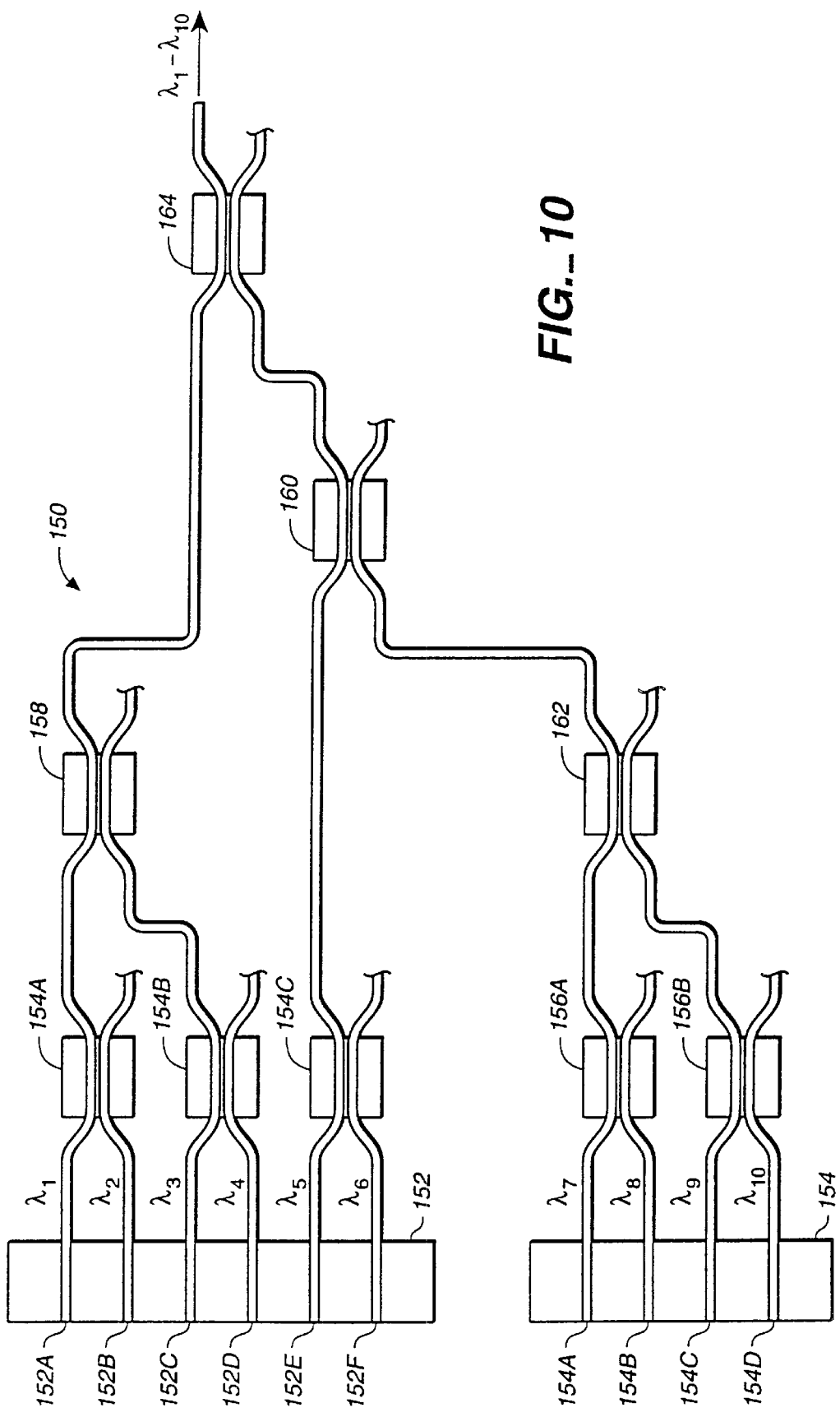
FIG._10

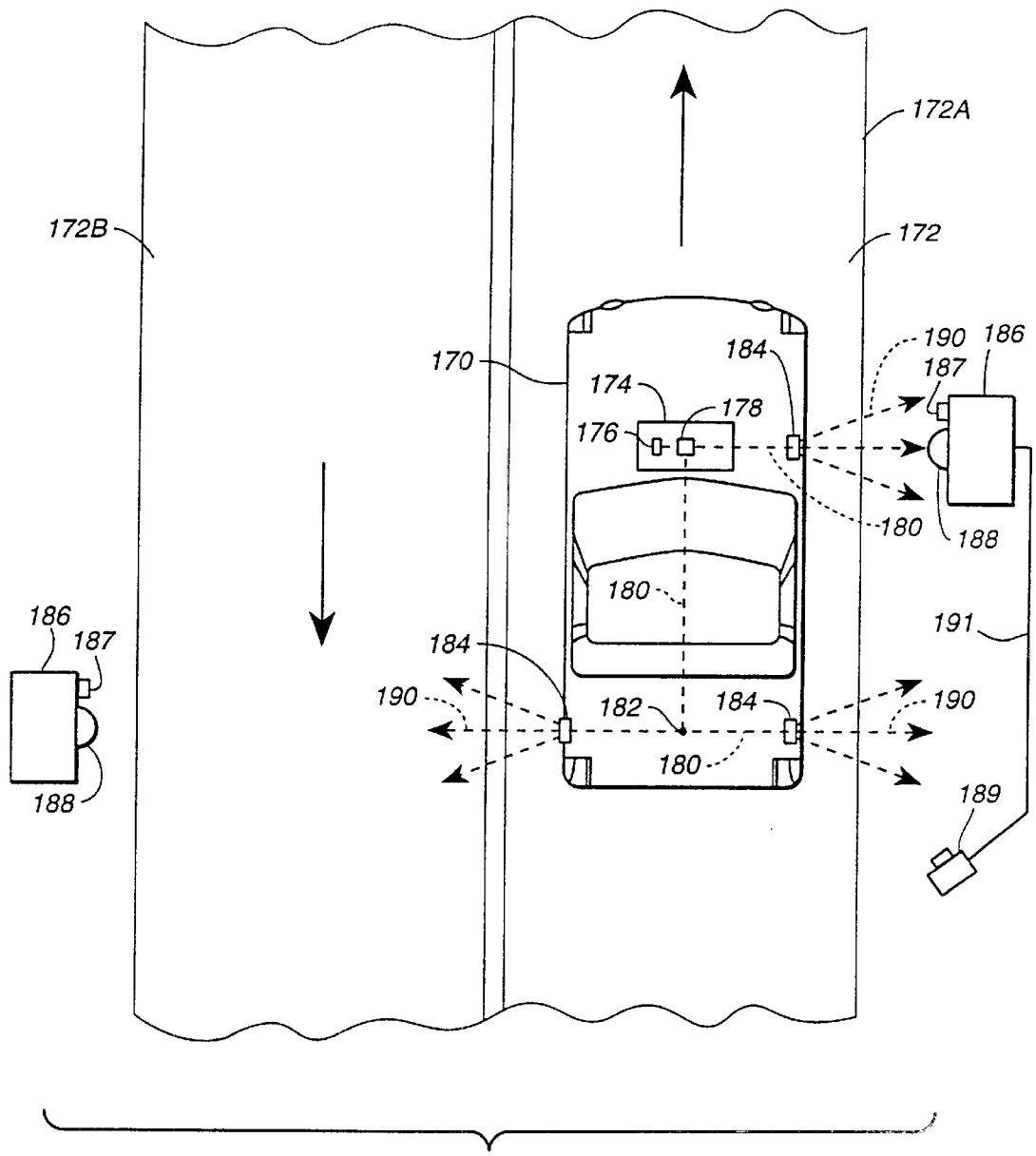
FIG._11

ADDRESSABLE VEHICULAR LIGHTING SYSTEM

RELATED APPLICATION

This is a continuation of U.S. patent application Ser. No. 08/902,741, filed Jul. 29, 1997, now U.S. Pat. No. 6,152,588 issued on Nov. 28,2000, which is a continuation-in-part of U.S. Patent application Ser. No. 08/313,757 filed Sep. 28, 1994, now U.S. Pat. No. 5,71.3,654.

TECHNICAL FIELD

The present invention pertains to the field of illumination, and more particularly to vehicular lighting systems.

BACKGROUND OF THE INVENTION

Numerous efforts have been made to increase the safety, reliability and efficiency of motor vehicles and aircraft while reducing the overall cost of manufacturing. The need is driven by increased emphasis on motor vehicle safety and to improve driver awareness of possible dangers relative to vehicles in close proximity, particularly as the number of vehicles on the nation's highways is rapidly increasing thereby increasing the odds for vehicular accidents. Essential to meeting these efforts is incorporating new and expanding technologies into the manufacturing and development of vehicular lighting systems in their warning capability and reliability. Optical technology has offered many benefits by providing less expensive and more reliable light sources than were previously available. Specifically, efforts have been made to provide improved vehicular lighting systems which substantially reduce the number of lamps or high temperature operated halogen or halide lamps used in a vehicular lighting system.

U.S. Pat. No. 5,311,410 to Hsu et al. is an example of a vehicular lighting system in which a central light source distributes white light, through fiber optic cables, to various areas of a vehicle. The central light source includes high intensity discharge lamps. The fiber optic cables distribute light to various optical loads of the vehicle's lighting system, including headlamps, tail lights and dome lights. The flux of the light is controlled through mechanical switches that move segments of the fiber optic cables into and out of alignment.

Another example of a vehicular lighting system is disclosed in U.S. Pat. No. 4,930,049 to Davenport et al. in which a light bus network distributes high intensity white light from a central light source to various components of a vehicle. The light bus network includes a number of electromechanical controls such as shutters, as well as collimating and focusing lenses.

A further example of a vehicular lighting system involving a central light source with light carried by a series of optical fibers to an array of headlight lenses is disclosed in U.S. Pat. No. 4,868,718 to Davenport et al. The ends of the fibers are held in stationary alignment with their respective lenses, while optical wedge lens or rotating flat members are inserted between the fibers and their respective lenses to provide for shifting between high beam and low beam positions.

While the exiting art discloses vehicular lighting systems that have one or more light sources for servicing a plurality of optical fibers as light transmission media, such as disclosed in U.S. patents to Krammer U.S. Pat. No. 5,365,413; Currie U.S. Pat. No. 5,400,225; and Hsu et al. U.S. Pat. No. 5,436,805, these systems either remain complex in system design or still require high power noncoherent light sources that require special treatment due to their high temperature of operation or motor-rotated for providing selective distribution of light to desired fiber outputs adding to the cost and reliability of operation to the system. While U.S. Pat. No. 5,365,413 mentions a possibility of using laser diodes in vehicular lighting systems, there is no disclosure how this might be implemented, taking into consideration the use of high temperature halide lamps in a system housing of this patent adapted for their particular utility and thermal considerations not capable of accommodating a semiconductor laser output. On the other hand, there are vehicular lighting systems disclosing the use of light sources provided at a central location for easy access that have noncoherent lamp outputs coupled to fiber optic waveguides via color lenses that themselves function as the light output device for the system to provide selection between a non-red or a red light output on a single fiber for indication, respectively, of turn signal or brake light signal, as disclosed in the U. S. patent to Currie U.S Pat. No. 5,400,225, mounted along the periphery of the rear window of the vehicle. Moreover, these prior vehicular lighting systems have the disadvantage of requiring numerous mechanical and thermal components to distribute light throughout a vehicle, thereby increasing both the size and expense of the systems.

What is needed is a centrally located vehicular lighting system that can accommodate coherent light sources that provides sufficient output brightness of light for fiber transmission to an optical load comprising the vehicular light output for a particular function such as a running light, turn signal light, backup light or a brake light.

It is an object of the present invention to provide an improved vehicular lighting system that is compact, lightweight, of simpler design and longer operational life.

It is a further object of the present invention to provide an improved vehicular lighting system that consumes substantially less power with dissipation of substantially less heat and provides for better space utilization with the availability of space in the vehicle compared to those currently suggested.

It is another object of this invention to provide light source redundancy to improve vehicular safety and reliability of the vehicular lighting system.

It is another object of this invention to provide multiple light sources per load for reliability and for providing moving vehicular conditional changes via illumination warning, such as vehicular braking or vehicular turning, in combination with multiple colors per optical load.

It is another object of this invention to provide a vehicular lighting system indicative to others via the same lighting of an applied brake pressure, hazard or other warning condition, or vehicular speed.

It is another object of this invention to provide a vehicle with an encoded light beam output for signaling data or information from a vehicle to roadside information gathering equipment such as a toll booth fee, parking meter fee, or vehicular identification for checking location and vehicular ID number.

SUMMARY OF THE INVENTION

These objectives are achieved according to this invention through the provision of a vehicle with a plurality of individually addressable light sources, preferably semiconductor laser light sources or light emitting diodes, each of which produce a beam of light that is optically coupled to a fiber optic waveguide. The laser light sources are grouped together preferably at a single location within the vehicle for easy access and conveniently located within the vehicle. Fiber waveguides distally transmits the beams to the optical loads of the vehicle, including the brake lights, taillights, instrumentation lights and turn signals. Each fiber optic waveguide may be a single optical fiber, such as a multimode fiber, having a numerical aperture large enough to receive illumination from a plurality of light sources. In cases where some optical loads require a larger flux or brightness of light, such as vehicular headlights, which may greater than a single optic fiber can transmit, the waveguide may comprise of a bundle of optical fibers. For purposes of this invention, a waveguide is defined as the transmission media within which light propagates to an optical load and may be comprised of one or more optical fibers or planar optical waveguide structures.

A circuit is electronically coupled to respective light sources to independently activate the source or alter source brightness by adjusting the supplied current. The structure of the laser light sources and the waveguides coupled to them is relatively small and lightweight. In addition, the light sources, such as semiconductor laser sources, consume significantly less power and operate at significantly lower temperatures than conventional incandescent light bulbs, halogen or halide lamps increasing the safety factor in automotive operation as well as increasing the life span of the vehicle's electrical system and any consequential damage that might occur due to the use of high temperature light sources, such as halogen lamps.

Conveniently locating the origin of the light sources as a single group provides many advantages. The grouping of the light sources facilitates reducing power fluctuations due to temperature variations by abrogating multiple heat transfer devices. Instead, the temperature of the present invention may be held constant by means of a single thermal electric cooler or compartmental heater. Further, as previously indicated, conveniently locating the group of light sources allows easy access for maintenance.

The preferred light sources utilized in this invention are semiconductor laser sources in the form of high power laser diodes or laser diode arrays providing power levels as high as several tens of watts to several hundreds of watts of combined output to an optical load, although light emitting diodes may be employed in some applications. However, laser sources are preferred because of their high brightness and optical power output with lower levels of required heat dissipation compared to the case of the lamps of Currie U.S. Pat. No. 5,400,225, supra, which generate higher levels of heat.

In another embodiment of this invention, multiple laser light sources are associated with each fiber waveguide to provide redundancy at the light source allowing one or more of the laser sources to fail without substantially affecting the level of light intensity supplied to one or more vehicular optical loads. In a further embodiment of this invention, different wavelengths representative of different colors may be mixed to produce different colors to selected optical loads so that different colors can be presented, cw or pulsed, at the same or different optical output loads indicative of different vehicular conditions. The mixing may be accomplished using optic fiber coupling, star coupling or WDM coupling.

In a still further embodiment of this invention, the laser or LED light sources may be modulated at either a low modulation rate, such as, for example, less than 30 Hz, so that pulsation of the light source is detectable by the human eye or are in combination with a higher modulation rate to provide for data modulation and transmission of data signals to off-vehicular light detection and monitoring systems. In this embodiment, the light source or sources may be either centralized or distributed around the vehicle. The light source may also be outside the vehicle with light detection means inside so as to, for example, measure vehicle velocity and report it to a display panel in the vehicle or use the external signal to remotely control the vehicle velocity.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 1 is a top view of a vehicle showing the positions of the various optical loads addressable via the present invention.

FIG. 2A is a detailed view of a fiber optic waveguide placed in the housing of an optical load of a vehicle according to this invention.

FIG. 2B is a detailed view of a fiber optic waveguide illustrating an alternate embodiment for an optical load housing of this present invention.

FIG. 2C is a detailed view of a fiber optic waveguide optically coupled to a reflective surface of an optical load housing according to further alternate embodiment of this invention.

FIG. 2D is a detailed view of a fiber optic waveguide formed of glass or plastic and formed into a coil to produce an optical load.

FIG. 3 is a plan view of a group of discrete laser light sources that may be employed in the embodiments of FIG. 1 and 1A in the practice of this invention.

FIG. 4 is a detailed front view of laser array light source that may be employed in the embodiments of FIGS. 1 and 1A the practice of this invention.

FIG. 5 is a perspective view showing a plurality of laser light sources in the form of unitary addressable laser bars or arrays optically coupled into a fiber optic waveguide according to an alternate embodiment of this invention.

FIG. 5A is a perspective view showing a plurality of laser light sources in the form of segment addressable laser bars or arrays optically coupled into a fiber optic waveguide according to another alternate embodiment of this invention.

FIG. 6 is a block circuit diagram of the laser taillight system according to this invention.

FIG. 7 is a side view demonstrating inter-vehicle communication according to one embodiment of this invention.

FIG. 8 is a schematic circuit diagram for providing an output signal of monotonically increasing light intensity or stepped light intensity from a laser source indicative of the magnitude of a given applied vehicular braking pressure.

FIG. 9 is a schematic circuit diagram for providing an output signal of monotonically increasing frequency or pulse rate proportional to monotonically increasing applied vehicular braking pressure.

FIG. 10 is a schematic illustration of output coupling of multiple vehicular light sources via single mode fibers and optical coupling of different wavelength color sources.

FIG. 11 is a plan view of another embodiment of this invention comprising a vehicle communication system having a modulated output for detection and monitoring by a roadside information gathering system.

DETAILED DESCRIPTION OF THE PREFERRED EMBODIMENTS OF THE INVENTION

Figure 1A:
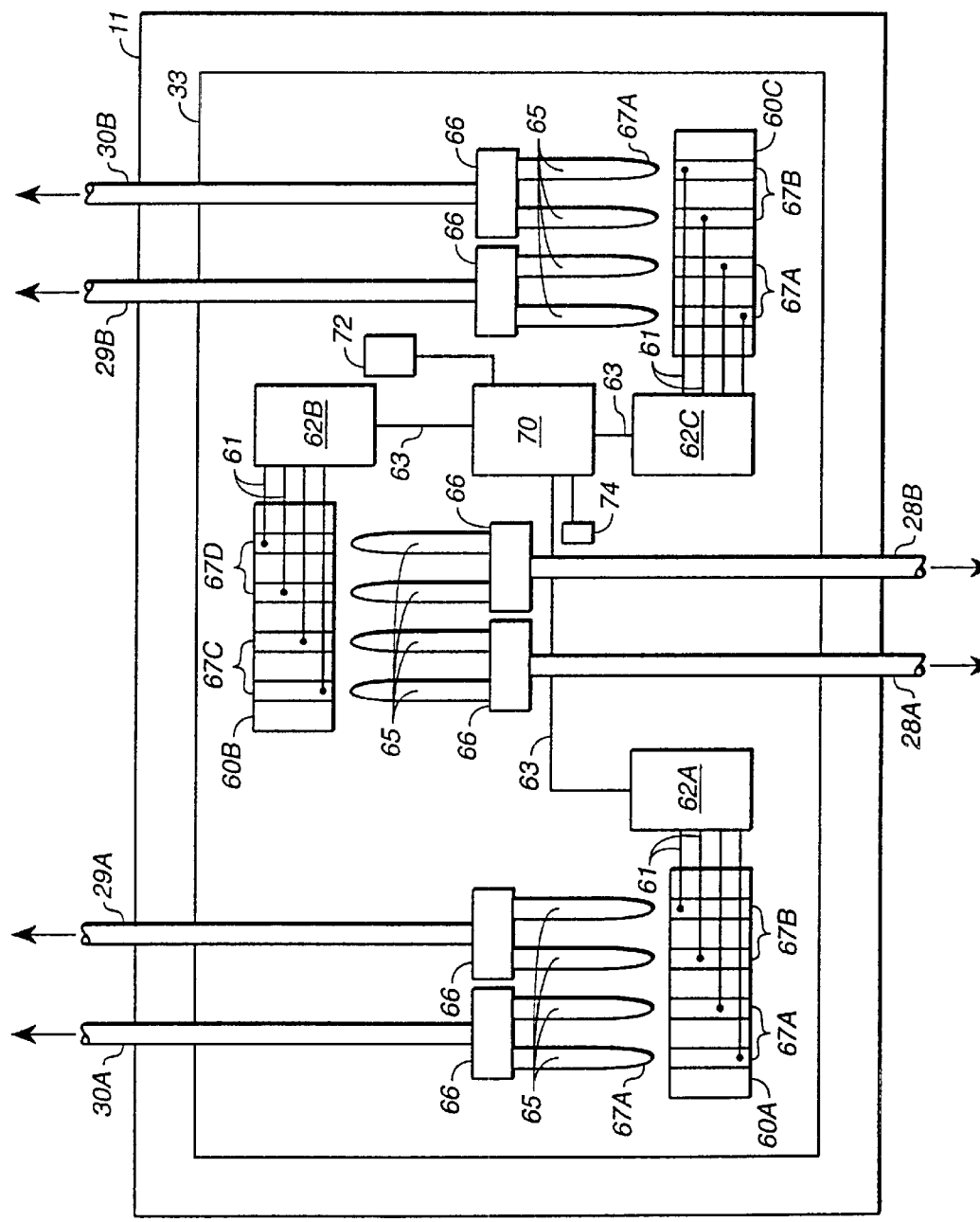
FIG. 1A is a more detailed view of the compartment containing the addressable light sources and its control for the vehicular lighting system of this invention.

Reference is now made to FIG. 1 showing an outline of a vehicle 10 equipped with taillights 12 and a high mounted brake light 13, commonly known as a collision avoidance light. Each taillight includes a brake light 14. These lights provide essential information to the driver of a preceding vehicle concerning the operation of the vehicle 10 indicating its deceleration, for example. Recent studies show that the high mounted brake light 13 substantially reduces the number of accidents occurring from vehicles being rear-ended by another vehicle.

A compartment or container 11 is located in a convenient location in vehicle 10, such as in the vicinity of or on the vehicle firewall, and contains most of, if not substantially all of, the light sources for the vehicle, i.e., the light sources contained in compartment 11 supply light for a plurality of different optical loads of the vehicles, such as taillights 12, running/turning lights 15, headlights 16, dashboard panel 17 and other interior lights 18. For purpose of exemplification of this invention, however, reference is limited to operation of the taillights 12 and the brake lights 13 and 14. The description is equally applicable to other optical loads, such as interior lighting and display panels of the vehicle. The exterior lights or display panels of the vehicle may include dispersion means which may be any light scattering or dispersion medium. In particular, headlights 16 are a special case requiring comparatively higher power output and brightness which will discussed later.

Compartment 11 comprises a plurality of light sources 25, which are shown in more detail in FIG. 1A as laser array sources 60A–60C. While LED sources are within the scope of this invention, visible laser light sources are preferred because of their high brightness and power levels and ability to combine their outputs to produce a high power output beam. These laser sources may be comprised of individual, discrete emitters or may be laser arrays or bars having individually addressable emitters, or groups of emitters forming a plurality of laser segments with the laser segments being individually addressable. Examples of such visible laser arrays are the SDL-7400 Series linear arrays manufactured by SDL, Inc. of San Jose, Calif. which, as combined, provide several watts, the output of which can be fiber coupled to an array of fibers each of which could be routed to the same or different optical loads. Another example is a visible or infrared array as disclosed in U.S. Pat. No. 4,862,802.

An optical fiber network 27 transmits light produced and combined from laser sources 25 to various optical loads of the vehicle. For example, optical fiber 28A transmits light to interior light 18 and optical fiber 28B transmits light to collision avoidance light 13; optical fibers 29A and 29B transmit light to brake lights 14; and optical fibers 30A and 30B transmit light to taillights 12. Each optical fiber may be a single optical fiber having a numerical aperture (NA) sufficiently large to transmit a substantial level of light, or may be a bundle of optical fibers.

Location of laser light sources 25 is an important factor because their output power can significantly change with varying temperature conditions. This significant point is not appreciated in the art set forth in the Background of the Invention since the sources utilized are not laser sources. Compartment 11 is thermally insulated from the outside environment and may be provide with an electric heater or a thermal electric cooler 33 or a combination of both to maintain control over the temperature of the laser sources at a given temperature level, As a result, potential for power fluctuations associated with temperature change is minimized, if not eliminated, to a level where power fluctuations from sources 25 are not visually discernible by a viewer.

Laser light sources 25 may be comprised of light emitting semiconductors that emit light with powers in the range from 5 mW to 30W beam, having a wavelength in the visible spectrum range of 400 n m to 700 nm and for red light, in particular, in the range of 620 nm to 700 nm. Semiconductor lasers that emit within the red light wavelength range are typically composed of AlInGaP or InGaAsP regimes formed on a GaAs substrate. These semiconductor lasers are commercially available as the SDL 7000 series either as single emitter devices or as multi-beam, separately addressed laser diodes or diode arrays. Semiconductor lasers may be made from other materials, e.g., GaN, AlGaAs, AlGaP, or ZnSe. For example, running lights employed in the United States as well as in foreign countries, such as Japan, are blue, green or amber color. For these applications, cw InGaN/GaN multi-quantum well laser diodes grown on sapphire substrates may be employed for producing blue or green wavelengths. Also, GaAsN or InGaN laser sources are within the scope of this invention. Also, arrays of frequency doubled diode lasers may be employed to create blue or green wavelengths such as disclosed in U.S. Pat. No. 5,644,584, assigned to the assignee herein and is incorporated herein by its reference.

With further reference to FIG. 1A, an arrangement for compartment 11 is shown that only includes three laser sources 60A, 60B and 60C for operating the taillights 12 and brake lights 13 and 14 of vehicle 10. Light sources and electrical and optical circuitry for other optical loads would also be located in compartment and would be operated in a similar fashion. Sources 60A, 60B and 60C each comprise a plurality of emitters 67 which may be of the same wavelength outputs or of different wavelength outputs, such as with 5 nm to 30 nm wavelength separation. In any case, the outputs of emitters 67 are respectively butt coupled to input fibers 65 or coupled via a collimating/focusing lens positioned between the fiber input end and the laser source. Pairs of input fibers may then be combined via a star coupler device or other standard coupling device 66. The combined beams are then supplied as output on the respective optical fibers 28A, 28B; 29A, 29B; and 30A, 30B. It should be noted that arrays source 60A–60C are shown having four emitters. This showing is for simplifying explanation, as these arrays sources may have 10 to 20 emitters or more and operated as groups or segments that independently addressable, as will be discussed later. Moreover, some array sources, such as source 60A can be two separate arrays for separate combined inputs to fibers 29A and 30A, one such source having a combined non-red output for taillight 12, via fiber 30A and the other such source having a combined red output, e.g., 630 nm, for the red brake light 14.

Each laser source 60A, 60B and 60C in FIG. 1A has a current supply source 62A, 62B and 62C, respectively for operating each of the emitters 67. The control of individual emitters 67 is achieved from controller 70 that is also connected to heater or thermoelectric cooler 33 via connector box 72. Also connected to controller 30 is a thermistor 74 for sensing the internal temperature of compartment 11 and operating heater/cooler 33 to maintain a predetermined temperature condition within the compartment. Controller 70 provides for temperature control through variation in current operation of the respective laser sources or their individual addressable emitters so as to reduce variation in the light output to a vehicular optical load due to vehicular temperature variations whether caused by atmospheric temperature changes, engine temperature changes or other such environmental changes. As previously indicated, compartment 11 is, therefore, thermally insulated from the outside atmosphere.

Controller 70 also provides appropriate signals via lines 63 to each current supply sources 62A, 62B and 62C for operation of vehicular lights. In the case of taillight or interior light operation, for example, Controller 70 provides a signal to sources 62A, 62B and 62C to operate laser emitters 67B or 67C via lines 61 to provide lighting to taillights 12 and interior light 18. In the case of emitters 67A and 67D, functioning as a brake lights, controller 70 provides a signal to sources 62A, 62B and 62C to operate these laser emitters to providing lighting to brake lights 14 and high mounted brake light 13. Thus, controller 70 provides for independent addressing and control of appropriate laser emitters to separate brake lights for their respective independent operation, as desired, as well as to other optical loads such as taillight/turn signal operation. More detail circuitry for the function of brake light operation is illustrated in FIGS. 8 and 9.

Instead of or in conjunction with the temperature control, the light output from each light source can be sensed by a light detector, such as a silicon detector. The electrical signal from the light detector may be employed in a feedback control circuit to vary the current to the light source to maintain its power output constant. Alternatively, a light detector may be utilized to measure the ambient light levels and adjust the current to the light sources so as to insure the optical loads have constant visibility. Specifically in bright daylight, the light sources for daytime operation, such as brake, turning signal or daytime headlamps, may be provided with higher current levels in order to provide a brighter light output that can be more readily observed by an observer.

Referring to FIG. 2A, a light beam propagates along the length of fiber 30B, supported in frame 130, and is incident upon lens 133 of comprising an optical load, e.g. a taillight. An important feature of the invention is that the beam, exiting from the output end of fiber 30B provides for sufficient diffusion of the coherent light so as to render it harmless when the beam is viewed with the naked eye beyond lens 133. This is at least partially accomplished by having the laser in a remote location from the optical load because the fiber reduces the laser brightness. That is, the laser power being emitted from, for example, a 1 $\mu$m by 100 $\mu$m emission aperture diode laser array having 10 laser elements on 10 $\mu$m centers may be coupled into a 400 $\mu$m fiber, thereby reducing the power per unit area by several orders of magnitude. This improves the safety of the source by reducing its brightness. Alternatively, source brightness may be reduced using an appropriate lens, diffuser, or light dispersing element 133. As an example, the outer surface of lens 133 may be comprised of a multitude of microscopic transparent lenses 135 having dimensions in the micron to centimeter range for dispersing the light in many different directions so that the light is refracted in many different directions and is transmitted through the lens with a wider expansion due to the dispersion with a larger angle of emission eliminating the brightness and damaging effect to the naked eye. In addition, a diffuser or diffuser lens combination 132 may be provided to receive the beam exiting the waveguide 30B to cause the beam to diverge and fill the inside of the dispersion lens 133. Accordingly, a fail-safe switch 134 could be operationally coupled between appropriate laser light sources 25 and each fiber so that the switch 134 terminates the beam propagating in fiber 30B, such as by extinguishing laser source 25, should lens or diffuser 133 be removed or otherwise become misaligned relative to the optical axis of the fiber or light beam. This prevents direct laser light from being viewed by the observer's naked eye.

FIG. 2B illustrates a further embodiment of an optical load that is simpler in design from that shown in FIG. 2A. Frame 130 supports fiber 30A which may be a single fiber or a bundle of fibers with their end or ends formed into a convex lens 136 to direct the light in multiple directions lens end 136 includes an array of microscopic transparent lenses 137 to diffuse the light.

FIG. 2C illustrates another optical load having a reflecting surface 138 positioned to receive light exiting fiber 30B. In this embodiment, reflecting surface 138 may be composed of a highly efficient reflecting diffusing material, reflecting 70% to 99% of the light exiting fiber 30B back toward the light to reflector shield 140. Reflector shield 140 may also have a reflecting dispersion surface 141 to redirect the light to the viewer, the original light beam having been diffused to a degree that the light would not be harmful to the naked eye. Also, reflecting surface 138 may be composed of non-diffusing material, wherein a diffusing lens 142 is interposed between the waveguide 30B and reflecting surface 138 to diffuse the light exiting from fiber 30B. Translucent materials also work well as a light diffuser when the light beam impinges on such material.

FIG. 2D also shows another simplified form of an optical load comprising a tightly coiled optical fiber 139. The coiled fiber may also be a group or bundle of tightly coiled optical fibers. The fiber may be glass or plastic fiber. The fiber as coiled may be subjected to a high temperature semi-fuse together the fiber coils to form a unitary structure as well as provide homogenous light scattering to form a more integral unitary optical load structure.

FIG. 3 discloses another embodiment for laser light sources 25 comprising discrete laser diodes 34, 35, 36 and 37. Although four laser sources are illustrated, any number may be present. Each of the laser light sources 34, 35, 36 or 37 emit a light beam which couples through a respective fiber lens 38 formed on an input end of a plurality of fibers 29A, 29B, 30A and 30B. Each laser light source 25 is discrete and is, therefore, capable of being individually addressed to provide light source operation independently of other laser sources. Each of the fiber optic waveguides extends distally to an optical load of the vehicle in a manner as previously described. This butt-coupling approach of sources 25 to fibers 29A, 29B, 30A and 30B is simple, effective and inexpensive providing for sufficient light coupling and brightness into the fiber for this particular application. The type of lenses 38 shown are conical-shaped lenses. However, these lenses may be wedged-shaped or chisel-shaped, as illustrated in Virendra S Shah et al. "Efficient Power Coupling from a 980-nm, Broad Area laser to a Single Mode Fiber Using a Wedge-Shaped Fiber Endface", *Journal of Lightwave Technology*, Vol. 8(9), pp. 1313–1318, September, 1990, or hyperbolic or semi-hyperbolic shaped, as illustrated in Christopher A. Edwards et al., "Ideal Microlenses for Laser to Fiber Coupling", *Journal of Lightwaue Technology*, Vol. 11(2), pp. 252–257, February, 1993, both of which are incorporated herein by their reference. In some instances, however, a cylindrical lens may be employed to collimate the so called fast axis, i.e., the transverse axis, of the laser source output prior to coupling the light into the lensed fibers, such as in a manner illustrated in U.S. Pat. No. 4,411,057 to Duda et al, which is incorporated herein by its reference. The transverse axis is the larger of orthogonal axes of semiconductor laser light output possessing the higher divergence angle. Fiber lenses 38 may also be aligned with the cylindrical lens for efficient coupling of more light due to collimation into the fibers. Such lensing is not required for many applications. Instead, a large plastic fiber can be butt coupled to the laser. Arrays of plastic fiber can also be coupled to arrays of laser sources or LEDs. Plastic fibers themselves will scatter some light and function to provide a decorative illumination or warning light along the length of the fibers as opposed to emission from the output end of a fiber or fibers. In one such example shown in FIG. 2D, the plastic fiber is formed as a coil with its end at the center and planar extent of the fiber coil functions as the illuminated optical load, such as for a warning light.

As previously illustrated, an alternative to employing discrete laser diodes 34, 35, 36 and 37 is to provide a monolithic array of laser light sources 39, illustrated in FIG. 4 having individually separated emitters or emitter regions 40, each emitting a light beam 41. Each emitter region 40 includes a contact 42 that can be addressed individually with a different level of current 42A as well as possibly all be driven by the same current level, to the respective emitter regions 40. Beam 41 generated by each emitter region 40 may, therefore, be controlled independently from other emitter regions in order to control light intensity levels at an optical load to which one or more of the beams are coupled via at least one, if not several, optical fibers. Thus, intensity of the light at the load can be varied in intensity or modulated such as, respectively, for a brake light or turn signal. Also, the light intensity output of the monolithic source can be monitored to maintain a predetermined intensity level so that, if one or more of the light emitters 40 no longer function, the change in the output intensity level of the emitters or the open circuit due to a non-functioning emitter or emitters, are determined or sensed, via, for example, an optical detector, and the output intensity is correspondingly increased by controller 70 to return the combined output of emitters 41 to the predetermined intensity level.

Optical fibers 29A, 29B, 30A and 30B in the various illustrations of this invention may be circular, square or rectangular in cross-sectional shape, the rectangular shape matching better the numerical aperture of the laser beam outputs. In this particular case, lenses 38 are preferably wedged-shaped to match the aperture shape of the light beam from laser sources 25 enhancing the input brightness to fibers 29A, 29B, 30A and 30B.

The light source apertures for the laser emitters described herein may be in the range of about 1 $\mu$m–3$\mu$m by about 10 $\mu$m–500 $\mu$m. A typical example is an output aperture of 1 $\infty$m by 100 $\mu$m. In order to provide for high brightness output, the individual emitters may be broad area laser diodes providing output powers in the range of milliwatts to several tens of watts. The power in the range of watts may require the use of multiple laser bar arrays or multiple broad area lasers which are commercially available, such as from SDL, Inc. of San Jose, Calif.

It should be noted that individual emitter regions 40 may be separated by barrier regions 43 not capable of generating light, as well as current conduction depending upon their structure as known in the art, and are sufficiently large in width so that there is no coupling of either applied current or generated light between adjacent emitter regions 40. This is important because if one emitter region should have defects responsible for its failure and capable of migration to adjacent emitters in the presence of applied current and/or generated laser light, then a sufficient width for barrier regions 43 will terminate or otherwise render such migration not possible. As a result, failure of one emitter will not be followed by the failure of other emitters due to migration of such defects. Such laser structures are important in the application of these light sources in vehicles to ensure a safety margin so that, with the failure of one or emitters of laser array 39, the remaining emitters can take up the continued operation to the optical load, with their light intensity increased as required. This safety is, of course, particularly important relative to operation of the brake lighting and turn signal lighting.

Also, as previously indicated, the light wavelengths produced by different emitter regions 40 may separately emit light over a relative narrow bandwidth of visible light while remaining substantially within a given color spectrum, such as several nanometers apart, so that the wavelength separation from one emitter to the next are sufficiently spectrally spaced from one another to prevent the development of laser speckle. Moreover, if necessary, such separated wavelengths can be conveniently combined, via optical coupling, for applications, such as brake lighting.

FIG. 5 shows an embodiment wherein each laser light source 101 includes a plurality of light emitters or light emitting regions 102, with each fiber 103 butt coupled to a plurality of light emitting regions 102. Emitters 102 are controlled as group via controller 104 which supplies an operating current to the emitters through a single contact. The numerical aperture of fibers 103 may be matched with the divergence angle of emitters 102 with the input end of each fiber 103 aligned with the plural laser emitting regions 102. Fibers 103 may be multimode fibers. Moreover, the diameter of an optical fiber 103 may be substantially larger in size than the light output from a single laser array 101 to allow efficient coupling of light into the input end of the fiber regardless of the lateral or transverse divergence angle of the plural light beams emitted from regions 102. Such an optical fiber may be a single multimode fiber or a plurality of multimode fibers.

By having multiple separate emitters 102 for each fiber 103, light source redundancy is provided so that failure of one or more emitters does not mean failure of the entire light source 101. This is particularly important for its use as a vehicular light, such as a brake warning light. Thus, in the example of FIG. 5, multiple light sources 101 may be employed for transmitting light from sources 101 to an optical load, such as a vehicular taillight or brake light, to provide reliable redundant light output, improving the lighting system reliability in case of failure of one or more emitters 102 or even one of more of the multiple light sources 101. In addition, laser speckle may be reduced by reducing the overall coherence of the output beam. This is accomplished by utilizing laser sources which emit multiple wavelengths or combining the outputs of many laser diodes each operating at its own wavelength.

As illustrated in the upper portion of FIG. 5A, laser array 101A may be comprised of different segments or groups 102A, 102B and 102C of laser emitters 102 with their outputs butt coupled into fiber 103. Segments 102A, 102B and 102C have separate contacts 101A, 101B and 101C, and each contact is electrically connected to controller 105. Controller 105 provides separate or independent operation of segments 102A, 102B and 102C. Thus, segments 102A, 102B and 102C are individually addressable allowing one segment to be operated at a time. When one segment fails, another may be operated in its place. This redundancy provides a longer lasting array of lasers that provide an appropriate level of service and safety even though some of the emitters may cease to operate. Further, it adds high reliability to the lighting system without substantially increasing costs in providing a laser array or its segment addressing. Also, segments 102A, 102B, for example, may be operated together as the primary output to fiber 103 so that, when a number of emitters of either of these segments fails, the third segment 102C may be brought on line via controller 105 through an appropriate sensing device monitoring the light output of laser array 102 positioned at the read facet extent of segments 102A–102C.

As illustrated in the lower portion of FIG. 5A, laser array 101B may be comprised of different segments or groups 106A, 106B and 106C of laser emitters 102 with outputs of different colors comprising wavelengths $\lambda_1$, $\lambda_2$ and $\lambda_3$, which may be mixed in fiber 103 to generate new color combinations, other than the primary or initial laser output colors, through selection of different applied currents via controller 107 to one or more segments 106A, 106B and 106C. These different wavelengths may provide for primary colors that may, themselves, be provided as source lighting to various optical loads of the vehicle, or may be combined to provide other colors useful at various optical loads of the vehicle. This may be employed for creating different panel light colors inside the vehicle at the choice of the driver or to indicate a change in vehicular conditions, such as an indication that the hand brake is still engaged or that the brake lighting has been applied. Controller 107 provides for independent operation of the plural laser emitters, via their individual contacts 101, so that different color combinations can be created among the three different wavelengths of light as well as different color hues by changing the current level provided to emitters 102 of different segments 106A–106C. Also, since segments 106A, 106B and 106C emit light of different colors, they may not emit the same light flux so that different number of emitters 102 may be required for different segments to provide an overall more uniform distribution of resultant light flux in the mixing of the light from the several laser segments. In this connection, note that segment 106C has four emitters 102 while segments 102A and 102B have three emitters each. A difference in applied current to segments 106A, 106B and 106C via controller 107 may also be different to the extent of equalizing the light intensity of different color output among the several segments.

Reference is now made to FIG. 6 illustrating a driver circuit 43 electrically coupled between each laser light source in light source 43A and a corresponding input device. The driver circuit 43 is provided to take advantage of individual addressing of each laser light source. It includes a multiplexer which permits control of each laser light source independent of the others. For example, input device 44 is associate with the brake pedal. When the brake pedal is depressed, it transmits a signal to the driver circuit 43 which, in turn, causes the appropriate laser light source to emit a beam, wherein the beam propagates along the appropriate fiber waveguide to illuminate brake lights 45. Input device 46 is associated with the taillights. When the taillights 47 are activated, input device 46 transmits a signal to the driver circuit 43 which, in turn, causes the appropriate laser light sources to emit a beam along the appropriate fiber waveguide to illuminate taillights 47. Other input devices 44A and 46A are connected to driver circuit 43, to operate other optical loads, e.g., turn signals 48, emergency flashers 49 and panel lights 50.

In addition, driver circuit 43 is capable of increasing the current to each laser light source individually. This allows the driver circuit to adjust the brightness of each laser light source individually, thereby compensating for aging effects, such as thermal wear, as well as adjusting for the ambient light level. This adjustment may be performed manually or automatically via microprocessor control. Any of the output optical loads, 45–49 for example, may also transmit data signal, such as, a modulated data signal from a circuit in controller 43A to an infrared source in laser source 43A, via an optical load at the vehicle rear to a light detector at another location, e.g., in a following vehicle 52. Referring to FIG. 7, this high speed data signal 51 provides a signal to a second vehicle 52 with information concerning the operation of the first vehicle 53, e.g. its velocity or rate of acceleration or deceleration. This would allow for speed adjustment within the second vehicle 52. As indicated, an infrared laser could be used for this purpose, as well as in combination with lasers transmitting visible light. The modulation rates of these laser sources may be from 0 to 1 GHz, if required. A rapidly flashing red brake light at approximately 0.1 Hz to 30 Hz would be visually perceivable by the other driver of the second vehicle 52. A light detector, such as Si detector 54, may be employed to sense a signal modulated at a much higher frequency, incapable of visual perception by a person, e.g., modulated at a frequency exceeding 60 Hz, which signal is read out in a speed indicator on the interior panel of the second vehicle 52.

Reference is now made to FIGS. 8 and 9 showing brake circuitry that may be utilized in the practice of this invention. In FIG. 8, circuit 75 provides for simple increase in the laser source output to the optical load when the vehicular brake system is operated via controller 78. The light source shown is segmented semiconductor LED or laser source 80 comprising three independently addressable laser segments 80A, 80B and 80C each having a plurality of laser emitters 81. Taillight switch 76 is on the driver panel of the vehicle and, upon activation, controller 78 will provides a current signal via line 79B to segment 80B of segmented laser 80 producing an output that is optically coupled to fiber 82B as output to optical load 83 which comprises a dispersion lens or scattering medium and functions as a running light, such as during night time operation. When the brake system is operated, brake switch 77 is closed and controller 78 activates the other two laser segments 80A and 80C via a current signal provided on lines 79A and 79C, respectively, each producing an output that is optically coupled respectively to fibers 82A and 82C as output to optical load 83. Thus, as a result of the application of the vehicular brakes, the output light is increased three fold to taillight 83.

Controller 78 may control the amount of current supplied to laser segments 90A and 90B as a function of applied vehicular braking pressure to the brake pedal of the vehicle employing a pressure sensing device in conjunction with the brake pedal, such as a piezoelectric element 87 of the type illustrated in FIG. 9. As a result, as the pressure applied to the brake pedal monotonically increases through driver operation, controller 78 provides monotonically increasing current to laser segments 80A and 80C which, correspondingly, montonically increases the light output intensity at load 83. Alternatively, the light output at load may be in steps in that, upon the pressure applied to the brake pedal reaching a first threshold, laser segment 80A is operated via controller 78 to provided a first brake light level at load 83. Upon pressure applied to the brake pedal reaching a higher second threshold, laser segment 80C is also operated via controller 78 in conjunction with laser segment 80A to provided a second, higher brake light level at load 83.

Circuit 75 may also be employed for other lighting loads of the vehicle. For example, segment laser 80 may be employed in conjunction with a turn signal function to optical loads 12 in FIG. 1. In this case, to achieve an amber light as a turn signal, the color may be provided by a yellow, red or range LEDs or by mixing a blue GaN based laser diode at approximately 400 nm to 460 nm with red diode laser at approximately 630 nm to 690 nm. Such red laser sources are presently available from SDL, Inc. of San Jose, Calif. while blues sources have been demonstrated by Nichia, Inc. of Japan. All three laser segments 80A–80C may be operated in unison via a modulator in controller 78 to modulate the laser segments in an ON/OFF pulsed sequence such as in the frequency range between 0.1 Hz to 30 Hz. Alternatively, laser segment 80B may remain cw operated while laser segments 80A and 80C are modulated in unison. When the turn signal is extinguished, operation of all three laser segments are terminated by controller 78.

It should be understood relative to the embodiments of this invention where different color sources, via light sources having different wavelengths, are utilized, mixing of the light output of such different color sources may be accomplished by optical fiber coupling. These laser sources, as combined, may then be individually addressable to mix and create different color combinations or separate colors at the optical output depending upon the light usage, such as a flashing amber light or amber turn signal light or red or blue/red warning or brake light. The color light sources may be separate devices of different wavelengths or laser bars or arrays having emitters of different wavelengths employing DFB gratings having different grating periods for discrete devices or DFB gratings of laterally varying grating period laterally across a laser array formed by e-beam techniques during fabrication of the array as is already taught in the art. As an example, some of the individually addressable light sources may emit light in the range of 400 nm to 500 nm while others emit in the range of 500 nm to 700 nm. Moreover, by varying the intensity of different separately addressable lights, a range of different colors can be created such as by means of optical fiber multiplexing at different levels if intensity.

Reference is now made to FIG. 9 which shows electrical circuit 85 for a vehicular braking system which provides an pulsating output at the brake light load which montonically increases with frequency or pulsation rate as the applied pressure is montonically increased. Circuit 86 comprises brake switch at the brake pedal in combination with piezoelectric element 87. The output of piezoelectric element 87 is connected as an input to voltage control oscillator (VCO) circuit 88. The output of VCO circuit 88 is one of the inputs to AND gate 90, the other input being a gate pulse on line 89. the output of AND gate 90 is connected to controller 91 which provides a drive current to LED or laser light source 92 at the pulse rate or frequency issue from AND gate 90. The pulsed output from light source 92 is then coupled via an optical fiber or fibers to brake light load 93. In operation, piezoelectric element 87 provides an analog output voltage which increases in magnitude with applied brake pressure. The output of VCO circuit 88 to AND gate 90 which is enabled by gate pulses at line 89 provided from a fixed-frequency clock. When gate is enabled, a pulse or series of pulses is provided to controller 91. As the analog voltage input from piezoelectric element 87 increases, the frequency of VCO 88 increases. As an example, if the gate pulses are at one second intervals, and the piezoelectric element with an amplified output may vary between 5 volts and 25 volts, then the frequency of VCO circuit 88 will vary from 5 Hz to 25 Hz and, correspondingly, the light pulsation rate at load 93 can be varied in frequency within this same frequency range. For voltages below a predetermined threshold, such as below 5 volts in the case above, the function of VCO circuit 88 would be bypassed and brake switch 86 connected directly to controller 91, such as is the case of FIG. 8, and the output from laser source 92 would be cw operation within this lower, threshold range for modulated operation.

With reference to the embodiments shown in FIGS. 8 and 9 for brake light operations, it should be understood that a warning light can be from the same laser source as the brake light and running lights wherein distinction among these functions is accomplished by means of changing the applied pulse rate via controller 78 or 91. In other words, the external vehicular light fixture may be the same for a running light, warning or hazard light and a brake light wherein the applied pulse for a running light may of long duration or cw, and in the case of a warning light may be a first pulse rate, $P_1$, and in the case of a brake light may be a second pulse rate, $P_2$, where $P_2 > P_1$ or visa versa, depending on the standard adopted. Pulse rates for $P_1$ or $P_2$, for example, can be in the range of 0.2 Hz to 30 Hz. Moreover, the periodicity may be changed with respect to changes in operation of the vehicle such as changes in vehicle velocity, deaccleration rate, acceleration rate or differentiation between a warning or hazard light and a brake light condition.

Reference is made to FIG. 10 which illustrates the combining of wavelengths from different laser sources that may be combined to produce different colors. For example, bar laser 152 may be comprised of six emitters 152A to 152F each having a different wavelength, at least some of which are visible wavelengths, and laser bar 154 may be comprised of four emitters 154A to 154D each having a different wavelength, at least some of which are visible wavelengths. Rather than laser bars, these emitters can discrete laser diodes or combination laser diode and frequency converter, such as via a frequency double crystal of the type illustrated in U.S. Pat. No. 5,644,584, supra. In the case of laser bars, techniques may be employed achieve different wavelengths at different emitters such as by means of different grating period patterns in the optical cavities of different emitters or selection of different compositional parameters along the length of the bar. In any case, the individual wavelength outputs, $\lambda_1 - \lambda_{10}$, may be progressively coupled, via couplers 154A to 154C, 158, 160, 162 and 164, to provide a combined wavelength output of $\lambda_1 - \lambda_{10}$. Thus, in order to produce different colors, such as primary colors, appropriate wavelengths from appropriate individually addressed emitters may be provided by selected emitter energization, or secondary colors may be produced by combined wavelengths from appropriate individually addressed emitters capable of providing the color with optical combining via the couplers. A controller is programmed to operated designated emitters to produce desired colors or color combinations based upon the particular color optical load application. As an example, two emitters 152B and 154A may have wavelengths in the yellow and red spectrum, respectively, which are combined at coupler 164 to produce an amber color at the output for a turn signal, for example. However, if the application is for braking, for example, emitter 152B is extinguished and red emitter 154A remains in operation with heightened intensity or pulsed output or combined heightened intensity and pulsed output.

The devices in FIG. 10 may, alternatively, be LEDs with optical combining of their outputs. Also, several of the wavelengths 11–110 may be close in spatial wavelength separation (e.g., 5 nm to 10 nm) relative to a single color and combined via a series of WDM couplers to produce a high intensity substantially single color output or combined to produce a high intensity white light output suitable for headlight usage.

Reference is now made to FIG. 11 which illustrates an application of this invention relative to a vehicular communication system for communication with a roadside detection and monitoring station or equipment to perform different kinds of functions, such as vehicular speed detection, vehicular count, vehicular identification, or vehicular toll payment. In FIG. 11, a vehicle 170 is traveling on highway 172 having opposite travel lanes 172A and 172B. Vehicle 170 is equipped with vehicular communication system 174 comprising data source 176 and laser or LED source 178 which is modulated according to data that is transmitted from source 176. Modulated data from source 178 is transferred to plural optical loads 184 via optical fiber 180 and coupler 182. Optical loads 184, e.g., output lenses, are broadcasters and transmit the modulated optical data into space over a wide angle 190 to regions along the roadway where receiver units, such as roadside detection equipment 186 receives the broadcasted beam 190 via an optical detector 188, and decodes the information or transmits the information to another location for deciphering or decoding. The decoded information may identify the particular vehicle by manufacture number or state license, for example. Also, system 174 may be used to indicate prepayment of tolls at toll points so that toll both operation can be eliminated. Vehicular owners pay tolls in advance to the toll authority and are credited such that, when passing a toll point, the toll is automatically deducted from t e credited prepaid advance. It should be noted that roadside detection system 18 may also include a motion detector or other such detector 187 to sense presence of a moving vehicle so that if, for any reason, there is a failure to sense the optical signal from the vehicle any of the above stated applications of system 186, the system will forewarn authorities ahead of the lack of vehicular identification. Also, a camera 189 may be operated by system 186 via line 191 to photograph the vehicle to capture the license plate number. Such a system can also be employed to track fugitives from justice based upon vehicle identification by the monitored vehicular manufacturing identification number which is tied to license plate registration.

As an alternative, system 174 may be operated at radio transmission frequency with radio frequency receivers, but the use of an optical communication system, instead, eliminates interference with so many other radio frequencies emanating from so many vehicles as well as from other radio frequency sources present in the atmosphere. The optical source provides a means to eliminate source problems. While such sources are subject to dirty conditions at optical output loads 184 and detector, appropriate wavelength operation can significantly eliminate this problem, e.g., operation at IR wavelengths.

Although the invention has been described in conjunction with one or more preferred embodiments, it will be apparent to those skilled in the art that other alternatives, variations and modifications will be apparent in light of the foregoing description as being within the spirit and scope of the invention. Thus, the invention described herein is intended to embrace all such alternatives, variations and modifications as may fall within the spirit and scope of the following claims.

What is claimed is:

1. A vehicle light system for a vehicle comprising:
   a semiconductor laser light source having a plurality of lasing segments each generating a beam;
   excitation means for independently controlling each lasing segment
   multiple beams from the lasing segments being coupled via at least one optical fiber to an optical load visible to observation means external of said vehicle including individuals located outside the vehicle;
   said excitation means being activated by application of brakes of said vehicle producing a pulsed light output from a given lasing segment to the optical load providing a flashing light output therefrom maintained during a period of brake activation; and
   said excitation means further activating another lasing segment in the event of failure of said given segment to thereby ensure reliable operation of the optical load.

2. The vehicle light system of claim 1 wherein said pulsed light output has a pulse rate that is discernible to drivers of other vehicles.

3. The vehicle light system of claim 1 wherein said pulsed light output has a pulse frequency in the range of 10 Hz to 30 Hz.

4. The vehicle light system of claim 1 wherein said pulsed light output has a pulse frequency up to 1 GHz discernible by individuals outside the vehicle.

5. The vehicle light system of claim 1 wherein said laser light source emits light having a red wavelength.

6. The vehicle light system of claim 1 wherein said laser light source is a semiconductor laser diode.

7. The vehicle light system of claim 1 wherein said excitation means increases a frequency of operation of said pulsed light output in response to an increase pressure applied to said vehicle brakes.

8. The vehicle light system of claim 1 wherein said pulsed light output has a pulse frequency up to 1 GHz discernible by light detecting means external of the vehicle.

9. The vehicle light system of claim 1 wherein said laser light source emits light having an infrared wavelength.

10. The vehicle light system of claim 1 wherein said laser light source is a semiconductor laser array.

11. A vehicular lighting system for a vehicle comprising:
    a semiconductor laser source emitting light in the range of about 400 nm to about 700 nm;
    said laser source being coupled to a multimode optical fiber;
    said fiber carrying light from said laser source to an optical load on said vehicle; and
    said laser source having multiple monolithic lasing emitters which are emitting light at different wavelengths within the same color spectrum to provide light to said optical load with reduced speckle with high reliability due to source emitter redundancy.

12. The vehicle light system of claim 11 wherein said laser source is coupled to an optical fiber having a core diameter larger than an emitting aperture of said laser source and with a numerical aperture sufficient to capture a substantial fraction of light from said laser source.

13. The vehicular lighting system of claim 12 wherein said laser source aperture is in the range of about 1 $\mu$m to about 100 $\mu$m and said fiber core is greater than 100 $\mu$m.

14. The vehicular lighting system of claim 12 wherein current to said laser source is adjusted according to application of vehicular braking system.

15. The vehicular lighting system of claim 14 wherein said application is braking pressure application.

16. A vehicle light system for a vehicle comprising:

a laser source providing a laser beam of coherent light;

at least one optical fiber coupled at one end for receiving the laser beam;

circuitry for modulating the laser beam to provide a pulsed output;

dispersing means coupled to an opposite end of the optical fiber for expanding light from the beam and transmitting a pulsed light output outside of the vehicle; and said circuitry providing for an increase in the pulse rate of said pulsed light output in response to an increase in pressure applied to said vehicle braking system.

17. The vehicle light system of claim 16 wherein said circuitry provides a pulsed light output having a pulse rate in the range of 10 Hz to 30 Hz.

18. The vehicle light system of claim 16 wherein said light source emits light having a red wavelength.

19. The vehicle light system of claim 16 wherein said laser source is a semiconductor laser diode.

20. The vehicle light system of claim 16 wherein said light source emits light having an infrared wavelength.

21. The vehicle light system of claim 16 wherein said laser source is a semiconductor laser array.

22. A vehicle light system for a vehicle comprising:

a laser source providing a laser beam of coherent light;

at least one optical fiber coupled at one end for receiving the laser beam;

circuitry for modulating the laser beam to provide a pulsed output;

dispersing means coupled to an opposite end of the optical fiber for expanding light from the beam and transmitting a pulsed light output outside of the vehicle; and said pulsed light output containing information which is readable by an external optical detector.

23. A vehicle light system for a vehicle comprising:

a laser source providing a laser beam of coherent light;

at least one optical fiber coupled at one end for receiving the laser beam;

circuitry for modulating the laser beam to provide a pulsed output; and dispersing means coupled to an opposite end of the optical fiber for expanding light from the beam and transmitting a pulsed light output outside of the vehicle; and said pulsed light output containing information which is readable by an external optical detector located at a toll booth, said optical detector decoding the information to deduct tolls from a prepaid advance.

24. A vehicle light system for a vehicle comprising:

a semiconductor light source having a plurality of beam generating devices;

excitation means for independently controlling each beam generating device;

at least one optical fiber coupled at one end to multiple beam generating devices and at an opposite end to an optical load; and said excitation means activating one of the beam generating devices to provide light to the optical load and, upon failure of said one beam generating device, activating another beam generating device to provide light to the optical load.

* * * * *